US008261852B2

(12) United States Patent

Miyazawa et al.

(10) Patent No.: US 8,261,852 B2

(45) Date of Patent: Sep. 11, 2012

(54) PORTABLE POWER TOOL

(75) Inventors: Masamichi Miyazawa, Anjo (JP); Tomohiro Hachisuka, Anjo (JP)

(73) Assignee: Makita Corporation, Anjo-shi (JP)

( * ) Notice: Subject to any disclaimer, the term of this patent is extended or adjusted under 35 U.S.C. 154(b) by 144 days.

(21) Appl. No.: 12/450,957

(22) PCT Filed: May 13, 2008

(86) PCT No.: PCT/JP2008/058788

§ 371 (c)(1), (2), (4) Date: Oct. 20, 2009

(87) PCT Pub. No.: WO2008/140086

PCT Pub. Date: Nov. 20, 2008

(65) Prior Publication Data

US 2010/0096156 A1 Apr. 22, 2010

(30) Foreign Application Priority Data

May 15, 2007 (JP) ................................ 2007-129089
Apr. 3, 2008 (JP) ................................ 2008-097153

(51) Int. Cl.
*B23B 45/00* (2006.01)

(52) U.S. Cl. .......................... 173/170; 173/171; D8/170

(58) Field of Classification Search .................. 173/170, 173/171; D8/107, 61, 68, 70
See application file for complete search history.

(56) References Cited

U.S. PATENT DOCUMENTS 3,019,673 A * 2/1962 Zernell et al. ................. 173/219
4,664,381 A * 5/1987 Aaron ........................... 473/551
D387,263 S * 12/1997 Bidstrup et al. ................. D8/97
D396,624 S * 8/1998 Basilius ......................... D8/107
5,992,540 A * 11/1999 Smolinski et al. ............ 173/169
D426,760 S * 6/2000 Schultz ............................ D8/68
6,321,622 B1 11/2001 Tsuge et al.
6,796,389 B2 * 9/2004 Pusateri et al. ............... 173/170
D498,128 S * 11/2004 Sterling ........................... D8/68
D528,888 S * 9/2006 Nagasaka et al. ................ D8/68

(Continued)

FOREIGN PATENT DOCUMENTS

DE 79 05 217 U1 2/1979

(Continued)

OTHER PUBLICATIONS

European Search Report dated Oct. 1, 2010 in European Patent Application No. 08752660.4.

(Continued)

*Primary Examiner* — Paul R Durand

(74) *Attorney, Agent, or Firm* — Oliff & Berridge, PLC

(57) ABSTRACT

A power tool is provided with a prime mover which causes the tool to rotate and a housing which houses the prime mover. In a back-end face that is positioned on an opposite side on the housing from a tool side, a back-end groove, into which a user can position his/her web between his/her thumb and forefinger, is formed. A pair of side-face grooves, into which the user can place the thumb and forefinger, are formed in both side faces of the housing. A depth changing portion is formed in at least one of the side-face grooves, such that the depth is reduced toward the back-end face of the housing. According to this structure, even when the housing is gripped directly from the back-end face, the user can easily draw up or raise the power tool.

13 Claims, 16 Drawing Sheets

U.S. PATENT DOCUMENTS

| | | | | | |
|---|---|---|---|---|---|
| D533,423 | S | * | 12/2006 | Ino et al. | D8/68 |
| D539,110 | S | * | 3/2007 | Okuda et al. | D8/68 |
| 7,497,275 | B2 | * | 3/2009 | Brotto | 173/217 |
| D592,479 | S | * | 5/2009 | Price et al. | D8/70 |
| 7,766,097 | B2 | * | 8/2010 | Kondo | 173/217 |
| 2003/0146008 | A1 | | 8/2003 | Andriolo | |
| 2005/0121209 | A1 | * | 6/2005 | Shimizu et al. | 173/217 |
| 2006/0175069 | A1 | * | 8/2006 | Sakakibara et al. | 173/217 |

FOREIGN PATENT DOCUMENTS

| | | | |
|---|---|---|---|
| DE | 7905217 | | 5/1979 |
| DE | 88 00 465 | U1 | 1/1988 |
| EP | 0 142 650 | A2 | 5/1985 |
| EP | 0 346 949 | A1 | 12/1989 |
| EP | 1 321 246 | A2 | 6/2006 |
| JP | U 3-55176 | | 5/1990 |
| JP | A 2000-167785 | | 6/2000 |
| JP | A 2001-150366 | | 6/2001 |
| JP | A 2001-198856 | | 7/2001 |
| JP | A 2006-123086 | | 5/2006 |

OTHER PUBLICATIONS

Chinese Office Action dated Nov. 9, 2010 in Chinese Patent Application No. 200880015861.X (with partial translation).

Feb. 7, 2012 Japanese Notification of Reasons for Rejection issued in Application No. 2007-129089 w/translation.

Feb. 13, 2012 Russian Office Action issued in Application No. 2009146304 w/translation.

Mar. 12, 2012 Office Action issued in Chinese Patent Application No. 200880015861.X (with translation).

May 15, 2012 Office Action issued in Japanese Patent Application No. 2008-097153 (with translation).

* cited by examiner

PORTABLE POWER TOOL

CROSS-REFERENCE TO RELATED APPLICATION

This application claims priority to Japanese Patent Application No. 2007-129089, filed on May 15, 2007, and Japanese Patent Application No. 2008-097153, filed on Apr. 3, 2008, the contents of which are hereby incorporated by reference into the present application.

TECHNICAL FIELD

This invention relates to a portable power tool, and in particular relates to a structure for gripping a portable power tool.

DESCRIPTION OF RELATED ART

In a patent document 1 and a patent document 2 as below, portable power tools are disclosed. These portable power tools comprise a motor which rotates a driver bit and a housing which houses the motor. In a back-end face, positioned on a rear side of the housing opposite from a tool side, a back-end groove is formed, into which a user can place a web between a thumb and forefinger. A pair of side-face grooves, into which the thumb and forefinger can be placed, are formed in both side faces of the housing. According to the structure described in patent document 1 and patent document 2, the user, by placing the web between the thumb and forefinger in the back-end groove, and placing the thumb and forefinger in the pair of side-face grooves, can directly grip the housing from the back-end face. When the housing is gripped directly from the back-end face, power can easily be applied along the rotation axis of the tool, and the user can powerfully press the power tool against the workpiece.

Patent Document 1: Japanese Patent Application Publication No. 2000-167785

Patent Document 2: Japanese Patent Application Publication No. 2006-123086

DISCLOSURE OF THE INVENTION

Problem to be Solved by the Invention

In the case of the above-described power tool of the prior art, by directly gripping the housing from the back-end face, the user can powerfully press the power tool against the workpiece. However, if the housing is gripped directly from the back-end face and the power tool is drawn upward or raised upward, the weight of the power tool is strongly imposed on the user. Hence when for example using the power tool of the prior art in a task over a long period of time, there is the problem that the user tends to become fatigued. In light of the problem, this invention provides a portable power tool which is unlikely to tire the user, even when the housing is gripped directly from the back-end face.

Means to Solve the Problem

A power tool of this invention comprises a prime mover which causes the tool to rotate and a housing which houses the prime mover. In a back-end face of the housing that is positioned on an opposite side from a tool side, a back-end groove, into which a user can position his/her web between his/her thumb and forefinger, is formed. A pair of side-face grooves, into which the user can place his/her thumb and forefinger, are formed in both side faces of the housing. According to this power tool, the user, by placing the web between the thumb and forefinger in the back-end groove, and placing the thumb and forefinger in the pair of side-face grooves, can directly grip the housing from the back-end face. When the housing is gripped directly from the back-end face, the user can forcefully press the power tool against the workpiece.

In the above-described power tool, it is preferable that a depth changing portion be formed in at least one of the side-face grooves, such that a depth thereof is reduced toward the back-end face of the housing. With the depth changing portion, the surface of each side-face groove is inclined so as to face toward the tool side. With this configuration, when the user exerts force to pull the power tool, slipping of the thumb and/or forefinger along the side-face grooves is prevented.

In addition to the above-described depth changing portion, it is preferable that a constant-depth portion having a substantially constant depth, be formed in at least one of the side-face grooves, on the tool side of the depth changing portion. When the user applies pressing force to the power tool, if a fingertip of the user is positioned in a depth changing portion of a side-face groove, the user's fingertip tends to slide along the side-face groove. Hence it is preferable that the depth of the side-face groove is substantially constant in the range toward the tool side with respect to the depth changing portion.

It is preferable that at least one protrusion be formed in at least one of the side-face grooves. According to this structure, a large friction force can be induced between the surface of the side-face groove and the thumb and/or forefinger. The user then can easily draw the power tool upward.

In the above-described power tool, it is preferable that the back-end groove formed in the housing be deeper toward the back end of the housing. According to this structure, the web between the thumb and forefinger of the user, placed in the back-end groove, firmly fits into the back-end groove. Disengagement of the web from the back-end groove is prevented, and so the user can feel the power tool to be light.

In the above-described power tool, it is preferable that a flange portion protruding from the housing be formed in the upper portion of the back-end groove. It is preferable that this flange portion protrudes significantly toward the back end of the housing. According to this structure, the flange portion abuts from above to the user's web placed in the back-end groove. Because the web is held within the back-end groove, the user can feel the power tool to be light.

DETAILED DESCRIPTION OF THE INVENTION

Figure 1:
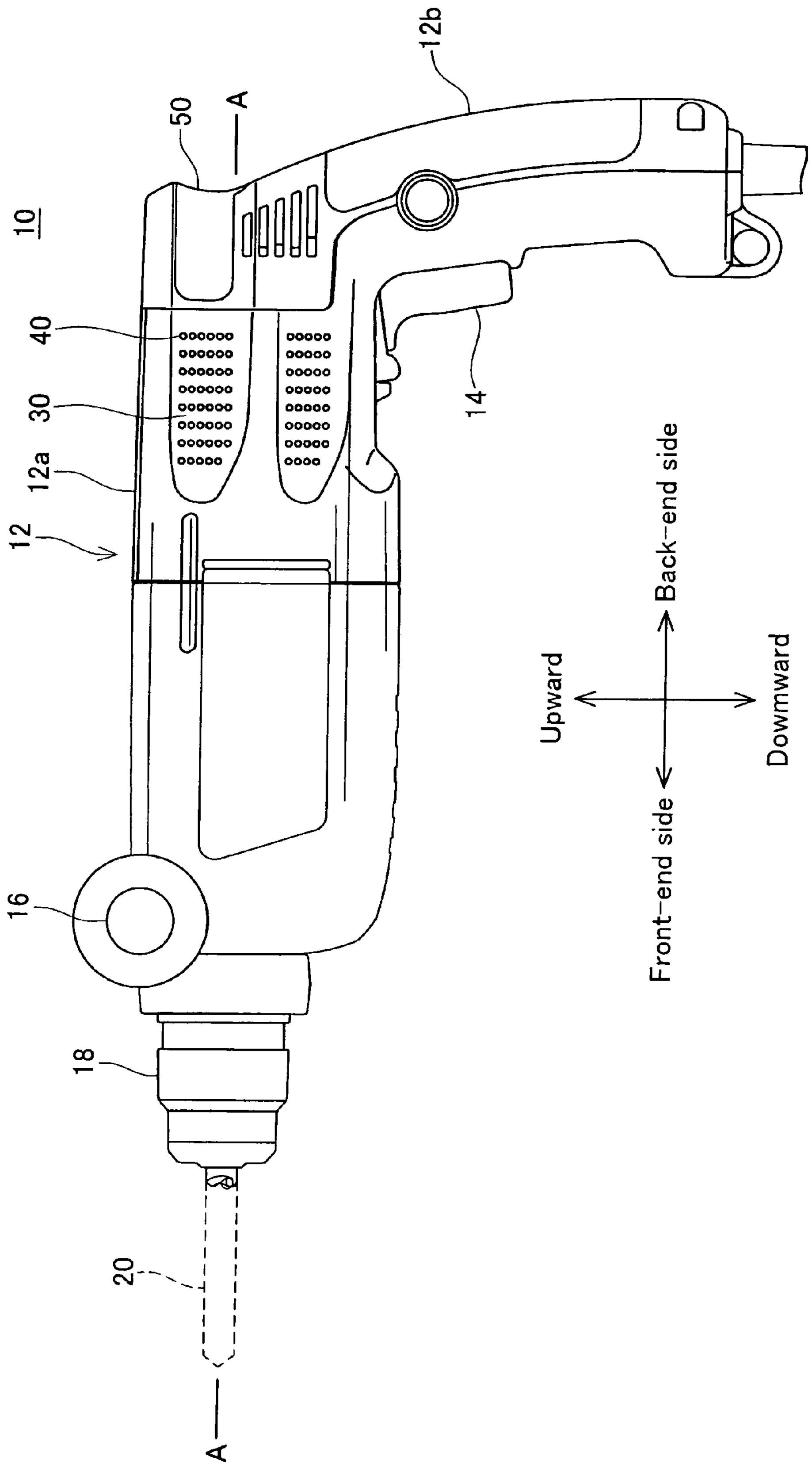
FIG. 1 is an external side view of a power drill.

Preferred Features of Embodiments (Feature 1) A housing comprises a housing body portion extending along a tool rotation axis, and a grip portion extending from the housing body portion. In a back-end face of the housing body portion that is positioned on an opposite side from the tool, a back-end groove, into which a user can place his/her web between his/her thumb and forefinger, is formed. A pair of side-face grooves, into which the user can place the thumb and forefinger, are formed in both side faces of the housing body portion. The grip portion is provided below the tool rotation axis, and the side-face grooves and back-end groove are provided above the tool rotation axis.

(Feature 2) On the grip portion is provided a trigger switch. With the thumb and forefinger placed in the pair of side-face grooves, the user can operate the trigger switch using the ring finger and/or little finger.

(Feature 3) The pair of side-face grooves has a mirror symmetry.

(Feature 4) A plurality of protrusions are formed in the pair of side-face grooves. The plurality of protrusions are provided in both depth changing portions and in constant-depth portions. The plurality of protrusions are formed from material which is softer than the housing, and which has a higher friction coefficient than the housing. The plurality of protrusions can for example be formed using an elastomer.

(Feature 5) A sheet material that is softer than the housing, is provided in the back-end groove.

Embodiment 1

The power drill of a first embodiment is explained referring to the drawings. The power drill of the first embodiment is a portable power tool, and in particular is a power tool used in forming holes.

Figure 2:
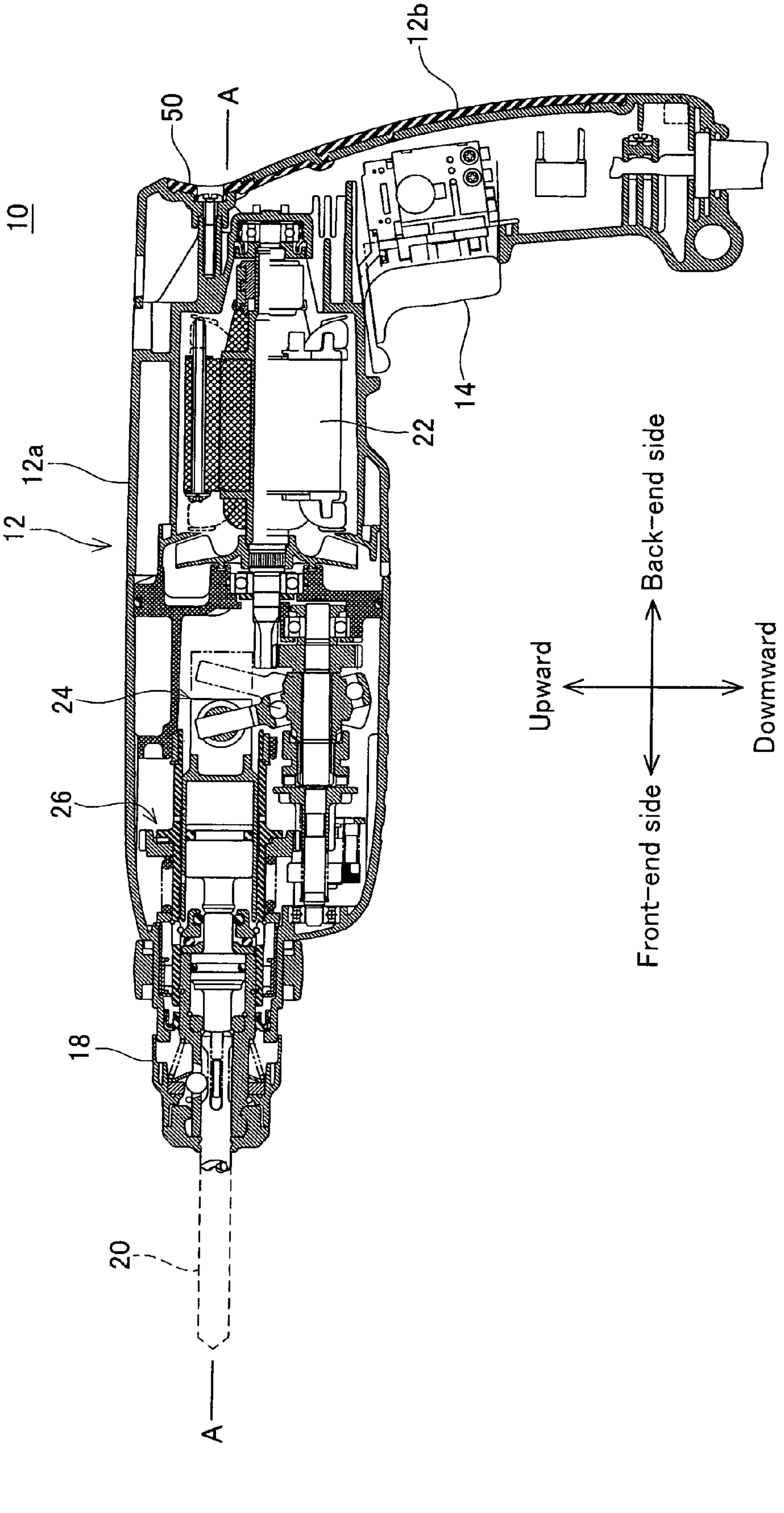
FIG. 2 is a cross-sectional view showing the internal construction of the power drill.

FIG. 1 shows an external side view of the power drill 10 of the first embodiment. FIG. 2 is a cross-sectional view of the power drill 10 shown in FIG. 1. As shown in FIG. 1 and FIG. 2, the power drill 10 comprises a motor 22, tool chuck 18 rotated by the motor 22, and reduction gear 26 which amplifies the rotational torque from the motor 22 and transmits the torque to the tool chuck 18. A drill bit 20, which is a tool for drilling holes, can be detachably mounted in the tool chuck 18. The power drill 10 can drill holes in wood, metal materials, concrete materials, and other materials. The power drill 10 also comprises a hammering mechanism 24, which converts the rotational motion of the motor 22 into reciprocating motion, to apply an impact force to the drill bit 20 mounted in the tool chuck 18. The power drill 10 can cause the hammering mechanism 24 to function selectively when for example performing chiseling tasks.

The power drill 10 comprises a housing 12 which houses the motor 22, hammering mechanism 24, reduction gear 26, and similar. The housing 12 is formed primarily from hard plastic material. The housing 12 comprises a housing body portion **12*a*, with a substantially columnar shape along the rotation axis A-A of the drill bit 20, and a grip portion 12*b* extending from the end portion of the housing body portion 12*a* on the side opposite the drill bit (the right side in FIG. 1 and FIG. 2). The grip portion 12*b* extends downward in FIG. 1 and FIG. 2, and forms a prescribed angle with the rotation axis A-A of the drill bit 20. The housing 12 has substantially an L-shape overall. The grip portion 12*b* is provided with a trigger switch 14, which is a startup switch for the power drill 10. And as shown in FIG. 1, a side grip 16 is provided at the end portion on the drill bit side (the left side in FIG. 1 and FIG. 2) of the housing body portion 12*a*. The side grip 16 extends from the plane of the paper in FIG. 1**.

In the following, the rotation axis A-A of the drill bit 20 is called the "tool rotation axis A-A", the end portion of the housing body portion **12*a* on the drill bit side (the left side in FIG. 1 and FIG. 2) is called the "front-end portion" of the housing body portion 12*a*, and the end portion of the housing body portion 12*a* on the opposite side from the drill bit (the right side in FIG. 1 and FIG. 2) is called the "back-end portion" of the housing body portion 12*a***.

As shown in FIG. 1, a groove 30 is formed in a side face of the housing body portion **12*a*, extending from the back-end portion along the tool rotation axis A-A. In FIG. 1, the groove 30 is formed above the tool rotation axis A-A. It is not necessary that the entirety of the groove 30 be positioned above the tool rotation axis A-A; it is sufficient that at least the deepest portion of the groove 30 be positioned above the tool rotation axis A-A. As will be described in detail later, another groove 30 is also formed in the side face on the opposite side, although not shown in FIG. 1. The pair of grooves 30 formed in the side faces of the housing body portion 12*a* is formed symmetrically and at positions above the tool rotation axis A-A (see FIG. 4**).

In the pair of grooves **30*m* a plurality of protrusions 40 is formed. The protrusions 40 are formed from a material softer than the housing 12. The protrusions 40 are formed from a material having a higher friction coefficient than the housing 12. In this embodiment, the protrusions 40 are formed from an elastomer. In the back-end face of the housing body portion 12*a* (the face at the end on the right side in FIG. 1), a groove 50 connecting the pair of grooves 30 is formed. The protrusions 40 are formed not only in the pair of grooves 30, but over ranges positioned below the pair of grooves 30** as well.

In the following, the grooves 30 formed in the side faces of the housing body portion **12*a* are called "side-face grooves 30", and the groove 50 formed in the back-end face of the housing body portion 12*a* is called a "back-end groove 50**".

Figure 3:
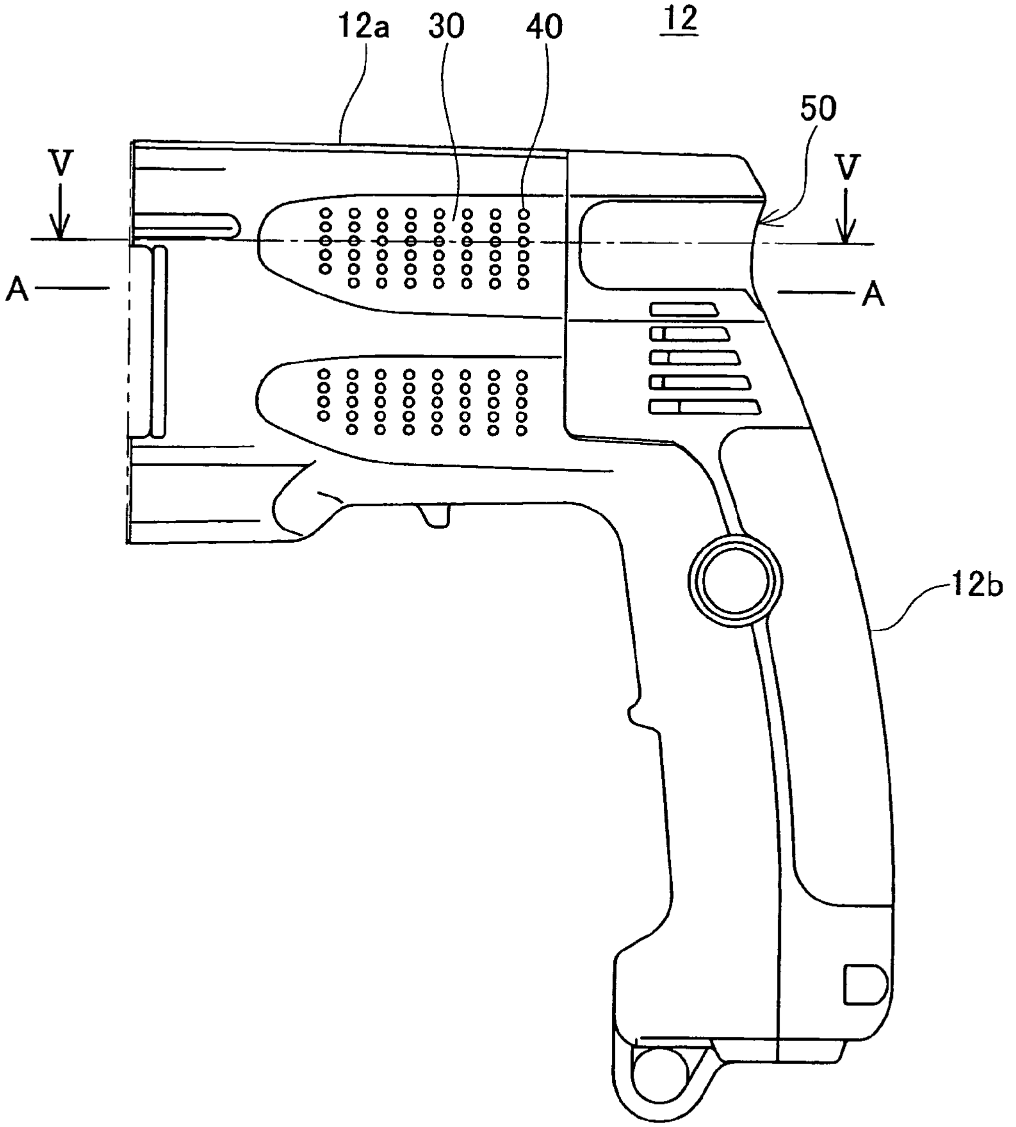
FIG. 3 shows a side view of a portion of a housing that is on an opposite side from a side where the drill bit is.
Figure 4:
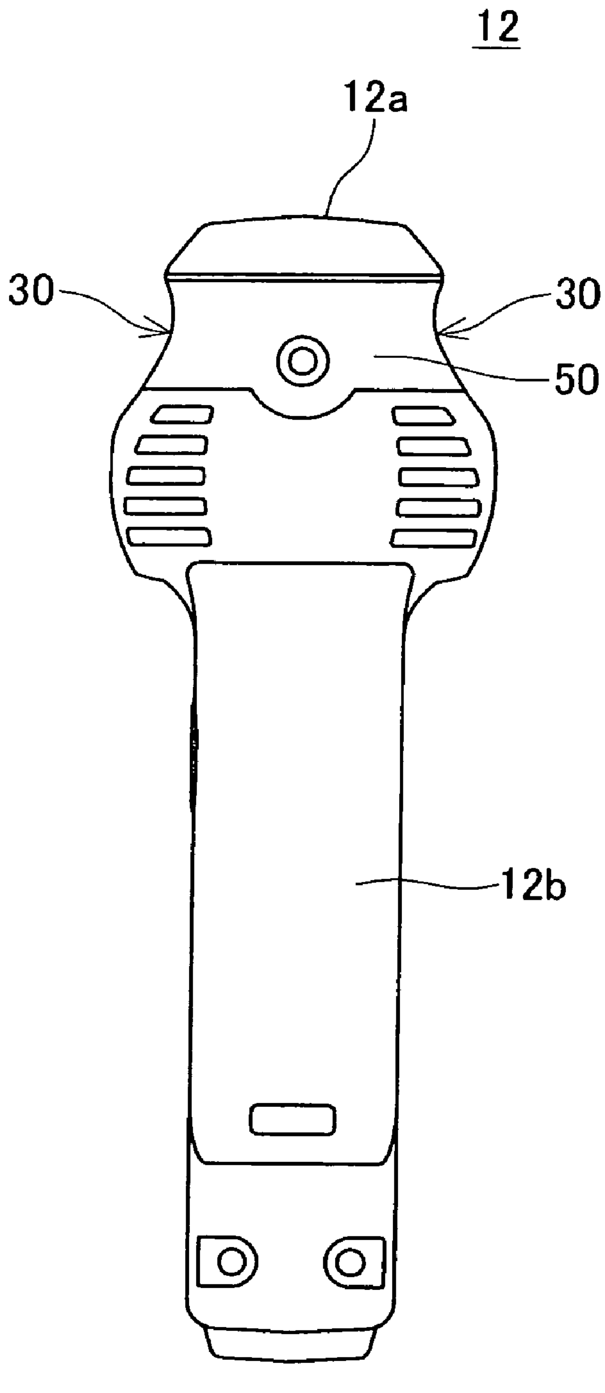
FIG. 4 shows a view of the portion of the housing, from the opposite the of the drill bit.
Figure 5:
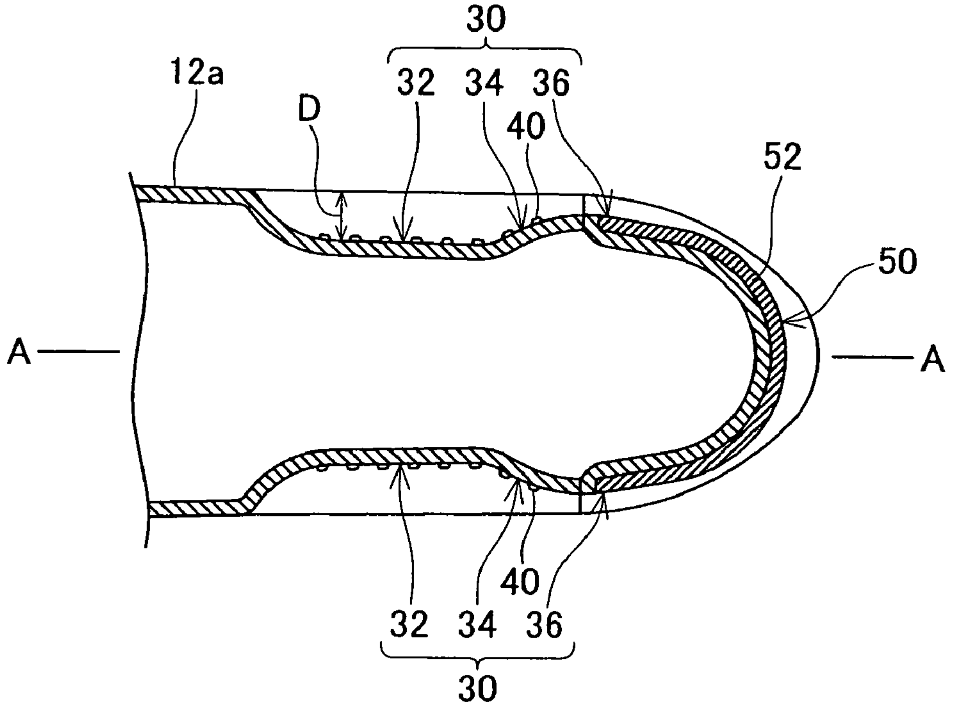
FIG. 5 shows a cross-section along line V-V in FIG. 3.

The pair of side-face grooves 30 and the back-end groove 50 formed in the housing body portion **12*a* are explained referring to FIG. 3 to FIG. 5. FIG. 3 shows substantially half of the side of the housing 12 that is opposite the drill bit. FIG. 4 shows the housing 12, seen from the side opposite the drill bit. FIG. 5 shows a cross-section along line V-V in FIG. 3. As shown in FIG. 3 to FIG. 5, the pair of side-face grooves 30 and the back-end groove 50 form a series of grooves extending so as to describe what is substantially a U shape. The cross-sectional shapes of the pair of side-face grooves 30 and the back-end groove 50** are concave curved surfaces.

As shown in FIG. 5, the pair of side-face grooves 30 can each be divided, according to its depth D, into a first portion 32, a second portion 34, and a third portion 36. The first portion 32 is a portion in which the depth D is substantially constant. The first portion 32 is positioned on the front-end side (the drill bit side) of the housing body portion **12*a* relative to the second portion 34. The second portion 34 is a portion in which the depth D decreases from the front-end side toward the back-end side of the housing body portion 12***a*; the surface thereof is gradually raised so as to face the front-end side of the housing body portion 12*a*. The second portion 34 is positioned on the front-end side (the drill bit side) of the housing body portion 12*a* relative to the third portion 36. The third portion 36 is a portion in which the depth D is substantially constant. The depth D of the third portion 36 is less than the depth D of the first portion 32.

The above-described plurality of protrusions 40 are provided in the first portions 32 and second portions 34 of the pair of side-face grooves 30. And, a deformable sheet 52, formed from an elastomer, is provided in the back-end groove 50. The deformable sheet 52 is more flexible than the housing 12, and has higher friction resistance than the housing 12.

Figure 6:
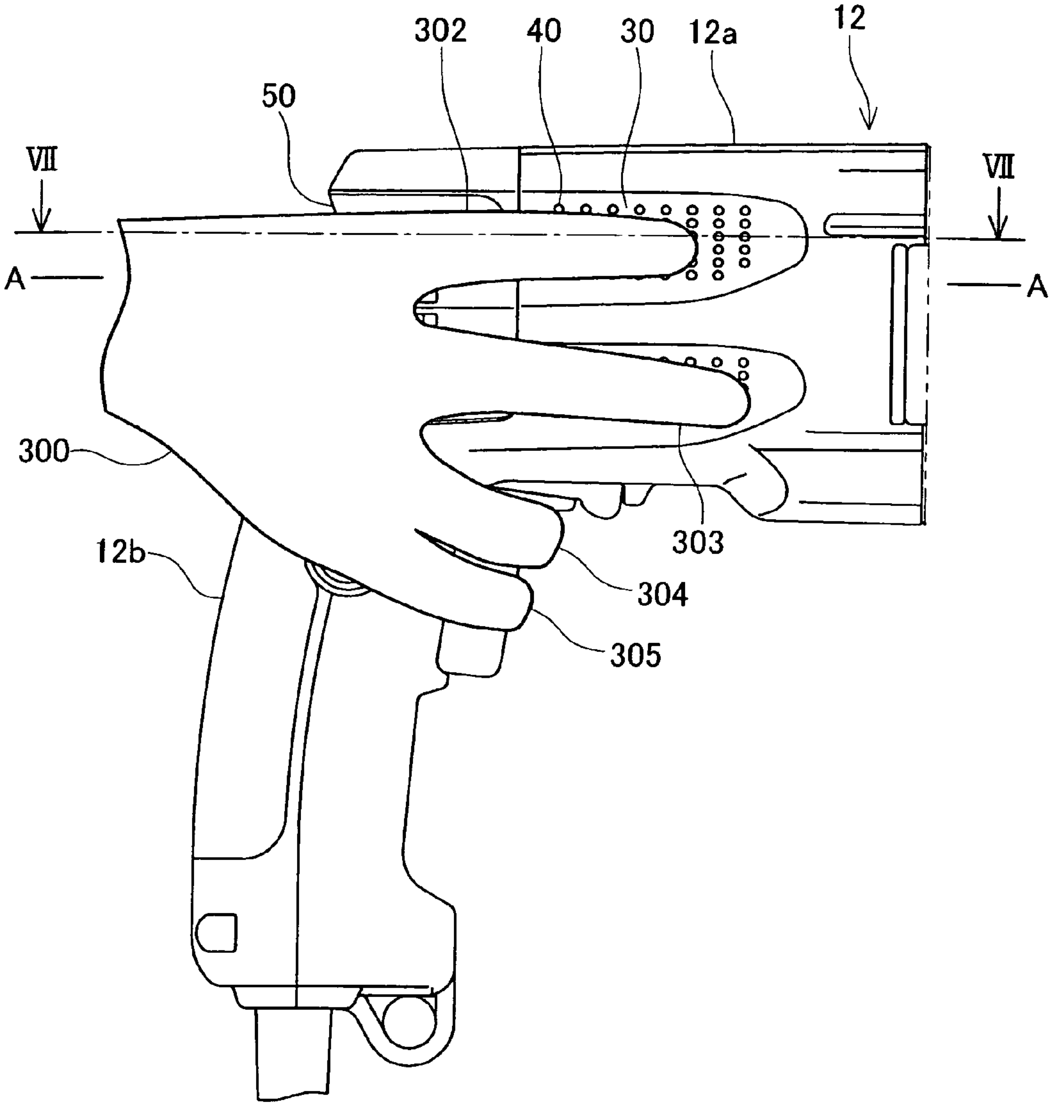
FIG. 6 shows a manner of gripping the power drill (when pressing)
Figure 7:
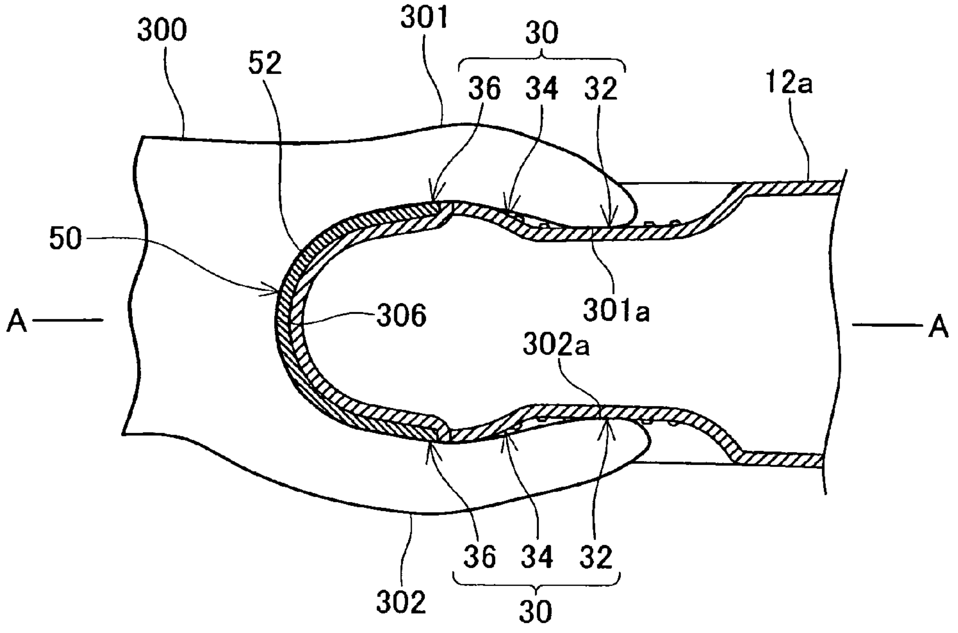
FIG. 7 shows a cross-section along line VII-VII in FIG. 6.

FIG. 6 and FIG. 7 show the manner in which the user grips the power drill 10. As shown in FIG. 6 and FIG. 7, the user places his/her thumb 301 and forefinger 302 in the pair of side-face grooves 30, places his/her middle finger 303 on a side face of the housing body portion 12, and places his/her ring finger 304 and/or little finger 305 on the grip portion 12*b*. In this way, the power drill 10 can be gripped firmly. At this time, his/her web portion 306 between the thumb 301 and forefinger 302 is placed in the back-end groove 50.

As shown in FIG. 7, the fingertips 301*a*, 302*a* of the thumb 301 and forefinger 302 are positioned in the first portions 32 of the pair of side-face grooves 30. The positions of the fingertips 301*a*, 302*a* may vary depending on the size of the hand 300 of the user. For the power drill 10 of this embodiment, the depth within the first portions 32 is designed to be substantially constant, and so the power drill 10 can be gripped correctly, regardless of the size of the hand 300 of the user. The trigger switch 14 is operated by the ring finger 304 and/or the little finger 305. The user can grip the side grip 16 with the other hand.

For the gripping attitude shown in FIG. 6 and FIG. 7, the hand 300 of the user is positioned above the tool rotation axis A-A. Hence the user can press the power drill 10 with considerable force along the tool rotation axis A-A. The user can easily press the drill bit 20 powerfully against the workpiece, and holes can easily be formed even in comparatively hard workpieces.

Figure 8:
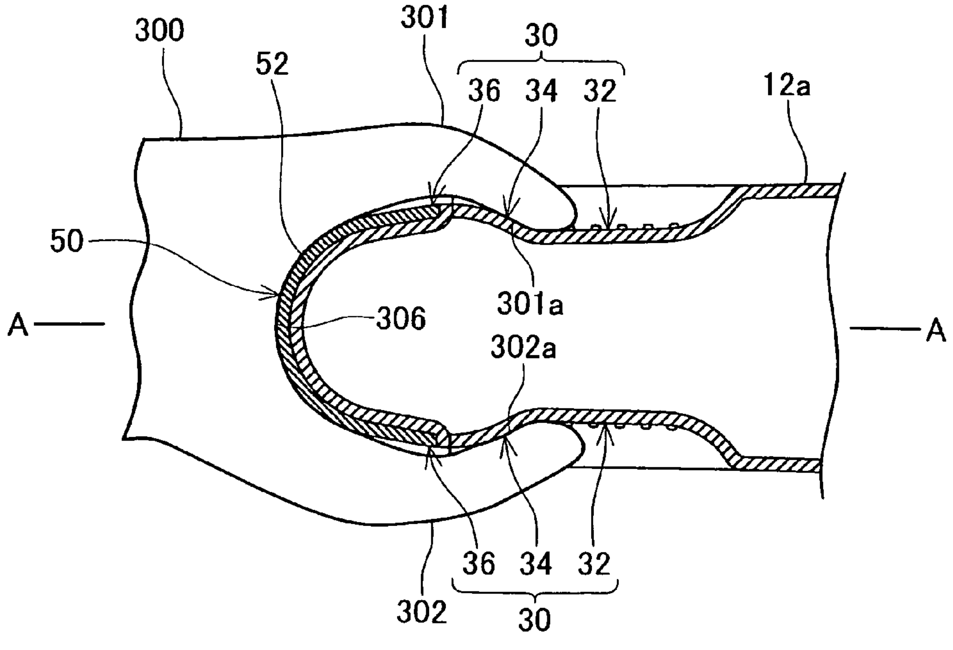
FIG. 8 shows a manner of gripping the power drill (when pulling)

After forming a hole using the power drill 10, the user must pull the drill bit 20 out of the hole that has been formed. In order to pull the drill bit 20 out of the hole that has been formed, the power drill 10 must be pulled comparatively powerfully along the tool rotation axis A-A. FIG. 8 shows the manner in which pulling force is applied to the power drill 10 along the tool rotation axis A-A. FIG. 8 corresponds to FIG. 7. As is clear by contrasting FIG. 7 and FIG. 8, the positions of the fingertips 101*a* and 102*a* of the thumb 101 and forefinger 102 change between when applying a pressing force and when applying a pulling force to the power drill 10. As shown in FIG. 8, when applying a pulling force to the power drill 10, the user can position the fingertips 301*a*, 302*a* of the thumb 301 and forefinger 302 in the second portions 34 of the respective grooves 30. As explained above, in the second portions 34 of the grooves 30, the depth D decreases from the front-end side of the housing body portion 12*a* toward the back-end side, and the surface is inclined so as to be facing the front-end side of the housing body portion 12*a*. Further, a plurality of protrusions 40 are formed in the second portions 34 of the grooves 30. Hence the user can pull the power drill 10 with comparatively powerful force along the tool rotation axis A-A without sliding the thumb 301 and forefinger 302. Using this configuration, the drill bit 20 can easily be pulled out of the hole that has been formed.

In addition to the gripping attitude shown in FIG. 6 to FIG. 8, the user can grip the grip portion 12*b* using all of the fingers 301 to 305 to hold the power drill 10. In this case also, the user can grip the side grip 16 with the other hand as well.

In the above, the power drill 10 of the first embodiment has been explained in detail; but this is merely an example, and in no way limits the scope of claims. The technology described in the scope of claims comprises various modifications and alterations of the specific example described above.

For example, the protrusions 40 formed in the pair of side-face grooves 30 may be formed in line shapes, such as for example in fingerprint patterns, in addition to the dot shapes in the above-described embodiment. Also, when for example the user wears thick gloves when working, it is effective to form the protrusions 40 from a material which is harder than the housing 12.

The technology utilized in the power drill 10 of the first embodiment can be employed in various other power drills. The advantageous effects of the present teachings are not deprived in application with any type of prime mover of the power tool (e.g., electric motor, pressurized-fluid motor, internal combustion engine), or of the task of the power tool (e.g., opening holes, tightening screws, chiseling).

Embodiment 2

An implementation in a power screwdriver of a second embodiment is explained, referring to the drawings. The power screwdriver of this embodiment is a portable power tool, and is a power tool used primarily for screw tightening tasks.

Figure 9:
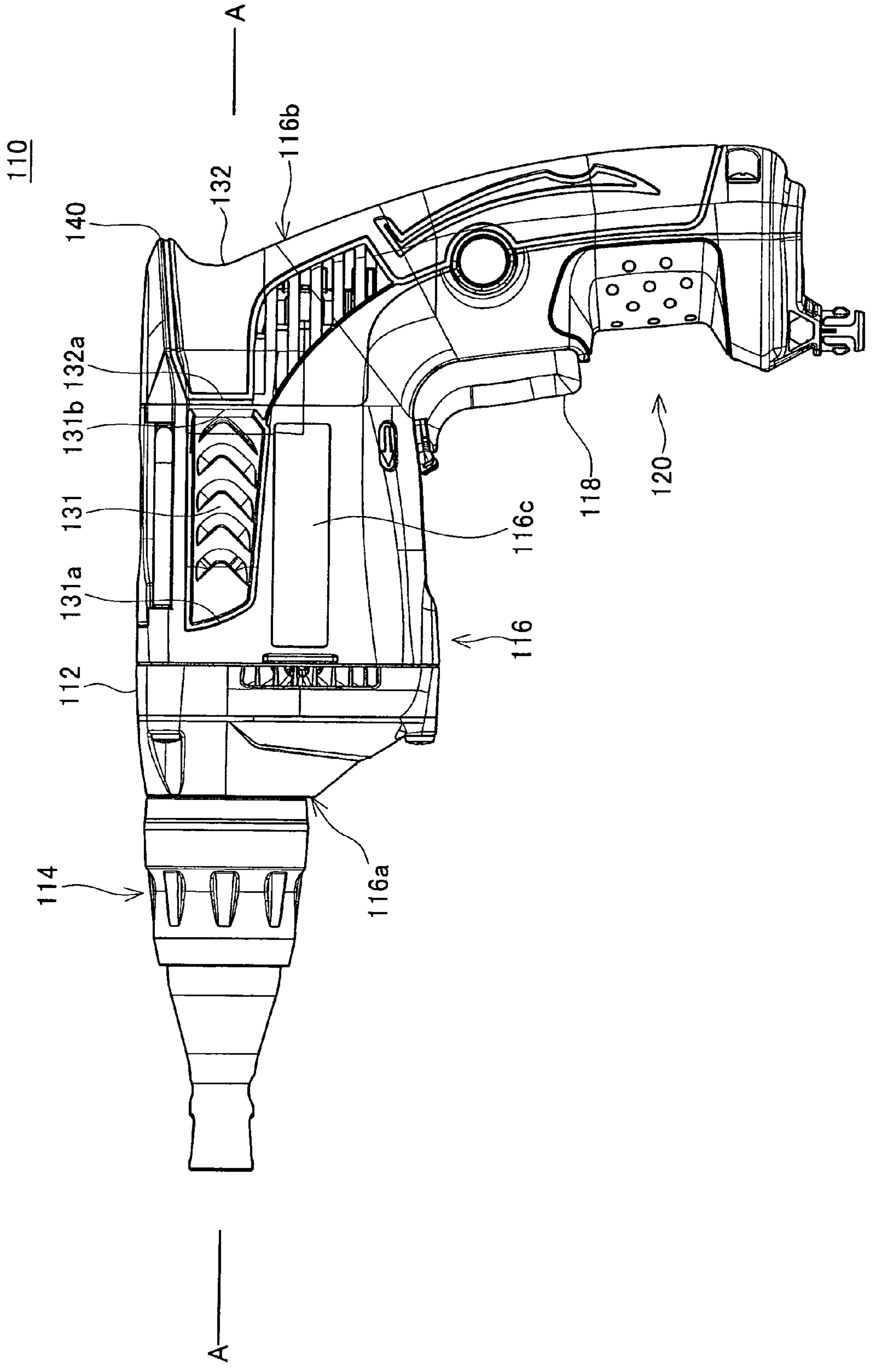
FIG. 9 is one side view of a power screwdriver.
Figure 10:
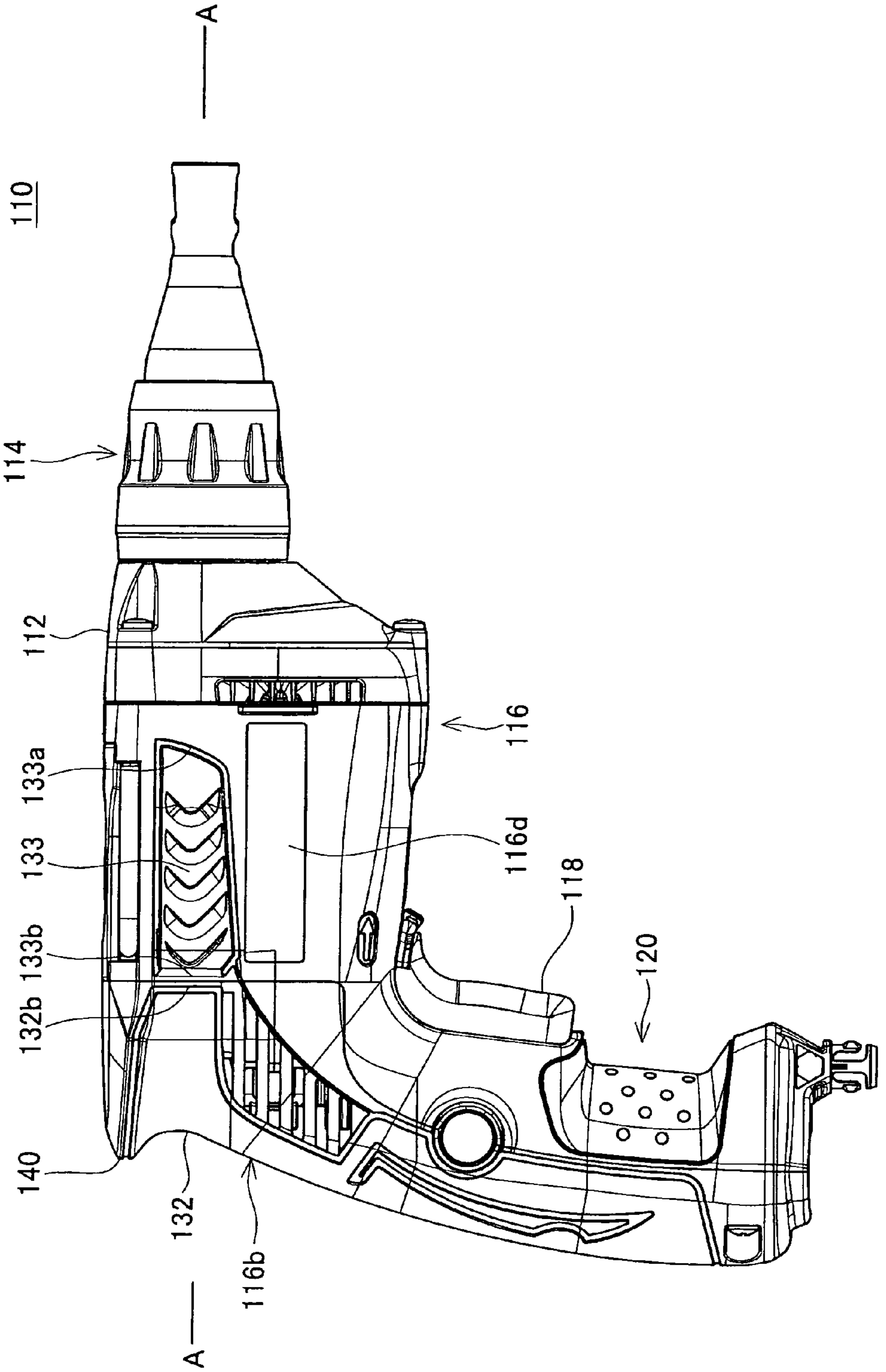
FIG. 10 is the other side view of the power screwdriver.
Figure 11:
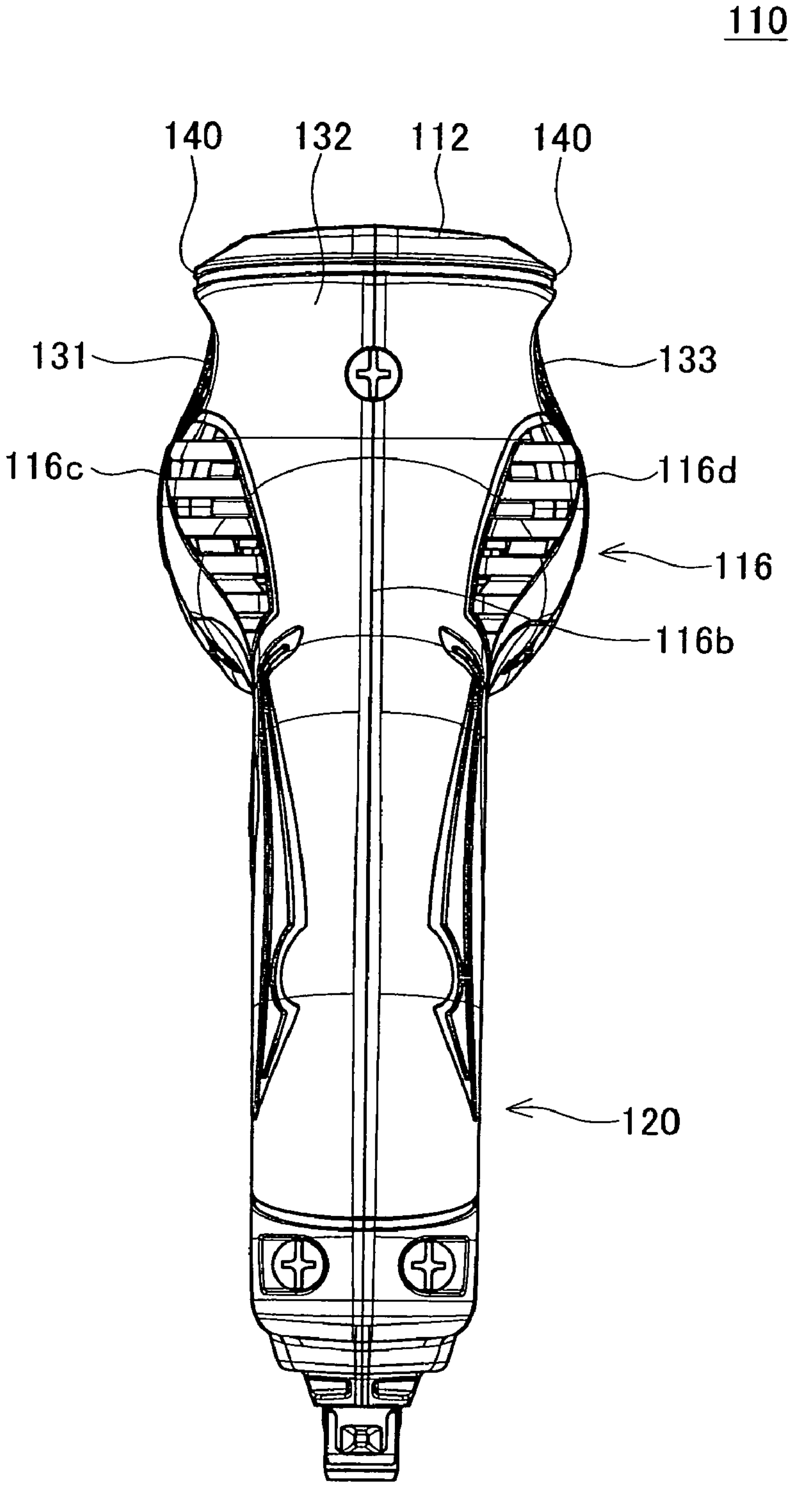
FIG. 11 shows a back-end portion of the power screwdriver.

FIG. 9 is one side view of the power screwdriver 110. FIG. 10 is the other side view of the power screwdriver 110. FIG. 11 shows the back end of the power screwdriver 110.

As shown in FIG. 9, the power screwdriver 110 comprises a housing 112, and a tool chuck 114 rotatably provided in the housing 112. A screwdriver bit, which is a screw tightening tool, can be detachably mounted in the tool chuck 114. The tool chuck 114 is driven in rotation by a motor (not shown) incorporated within the housing 112.

The housing 112 is formed mainly from a hard plastic. The housing 112 has substantially an L shape overall, and comprises a housing body portion 116 and a grip portion 120. The housing body portion 116 extends from a front-end portion 116*a* positioned on a side of the tool chuck 114, along a rotation axis A-A of the tool chuck 114, to a back-end portion 116*b* positioned on a side opposite from the tool chuck 114. Here, the rotation axis A-A of the tool chuck 114 is equivalent to the rotation axis of the screwdriver bit mounted in the tool chuck 114. Below, the rotation axis A-A of the tool chuck 114 may be called the "tool rotation axis A-A".

The grip portion 120 extends from a back-end portion 116*b* of the housing body portion 116 so as to form an angle with the housing body portion 116. As shown in FIG. 9 and FIG. 10, the housing 112 is in its overall L shaped. The grip portion 120 is provided with a trigger switch 118 to start the power screwdriver 110.

As shown in FIG. 8, FIG. 9 and FIG. 10, side-face grooves 131, 133 are formed in the side faces 116*c*, 116*d* of the housing body portion 116. The side-face grooves 131, 133 are provided in portions of the side faces 116*c*, 116*d* of the housing body portion 116 on the side of the back-end portion 116*b*. The side-face groove 131 formed in one side face 116*c* extends substantially in a straight line along the tool rotation axis A-A from the front end 131*a* to the back end 131*b*. Similarly, the side-face groove 133 formed in the other side face 116*d* extends substantially in a straight line along the tool rotation axis A-A from the front end 133*a* to the back end 133*b*. The pair of side-face grooves 131, 133 are formed symmetrically enclosing the housing body portion 116.

A back-end groove 132 is formed in the back-end portion 116*b* of the housing body portion 116. One end 132*a* of the back-end groove 132 is connected with the back end 131*b* of one side-face groove 131, and the other end 132*b* of the back-end groove 132 is connected with the back end 133*b* of the other side-face groove 133. That is, by means of the back-end groove 132, the pair of side-face grooves 131, 133 are connected together. The pair of side-face grooves 131, 133 and the back-end groove 132 form a series of grooves extending from one side face 116*c* of the housing body portion 116, to the back-end portion 116*b*, to the other side face 116*d*.

The entirety of the side-face grooves 131, 133 and the back-end groove 132 are formed above the rotation axis A-A of the tool chuck 114. However, the entirety of the side-face grooves 131, 133 and the back-end groove 132 is not positioned above the rotation axis A-A, and the deepest portions of the side-face grooves 131, 133 and the back-end groove 132 are positioned above the tool rotation axis A-A.

Figure 12:
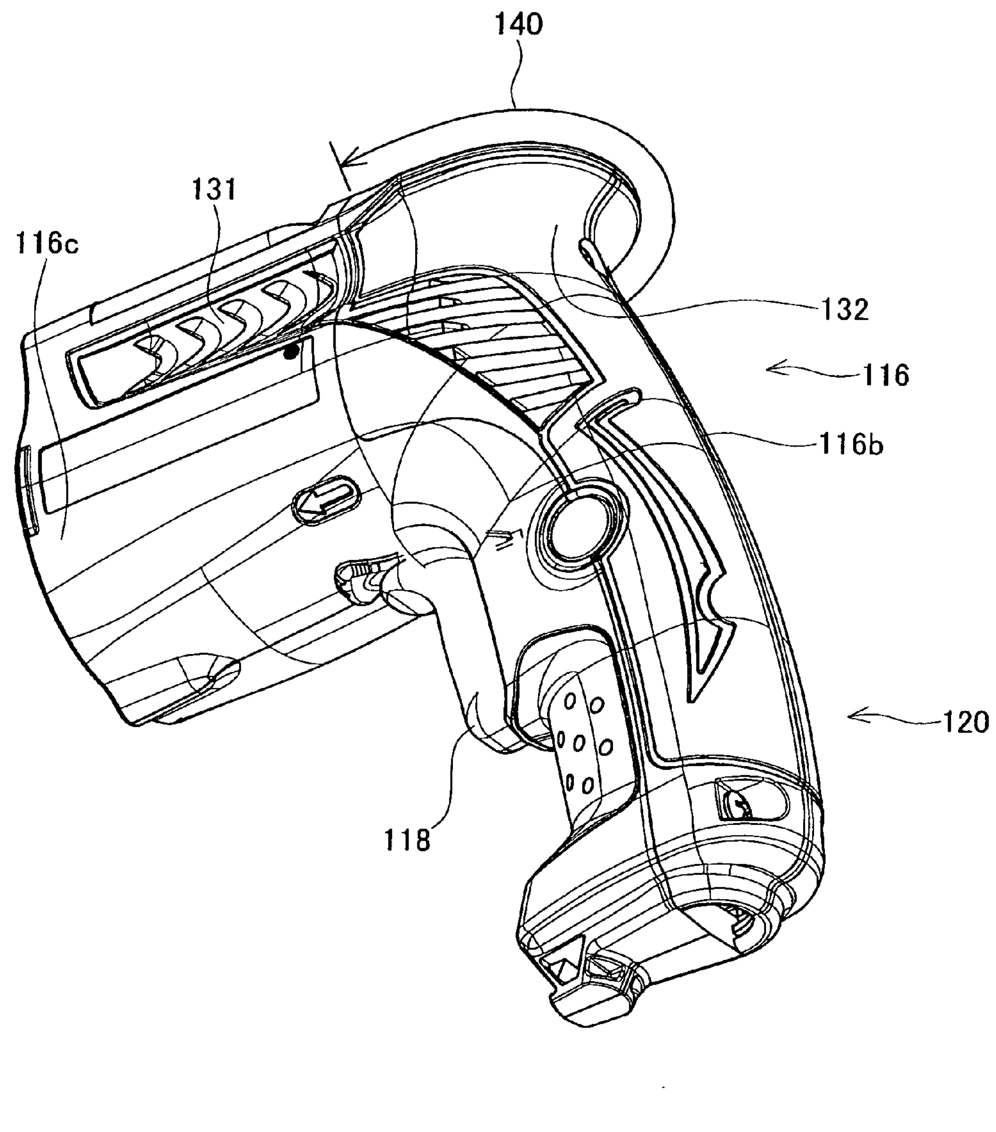
FIG. 12 shows the back-end portion of the power screwdriver, viewed perspectively upward from below.

FIG. 12 shows the back-end portion 116*b* of the housing body portion 116, perspectively viewed upward from below. As shown in FIG. 9, FIG. 10, FIG. 11, and FIG. 12, a flange portion 140 is formed in the back-end portion 116*b* of the housing body portion 116, in the upper portion of the back-end groove 132. The flange portion 140 protrudes in a flange shape in the direction in which the back-end groove 132 opens (the side directions and rearward direction of the power screwdriver 110).

Figure 13:
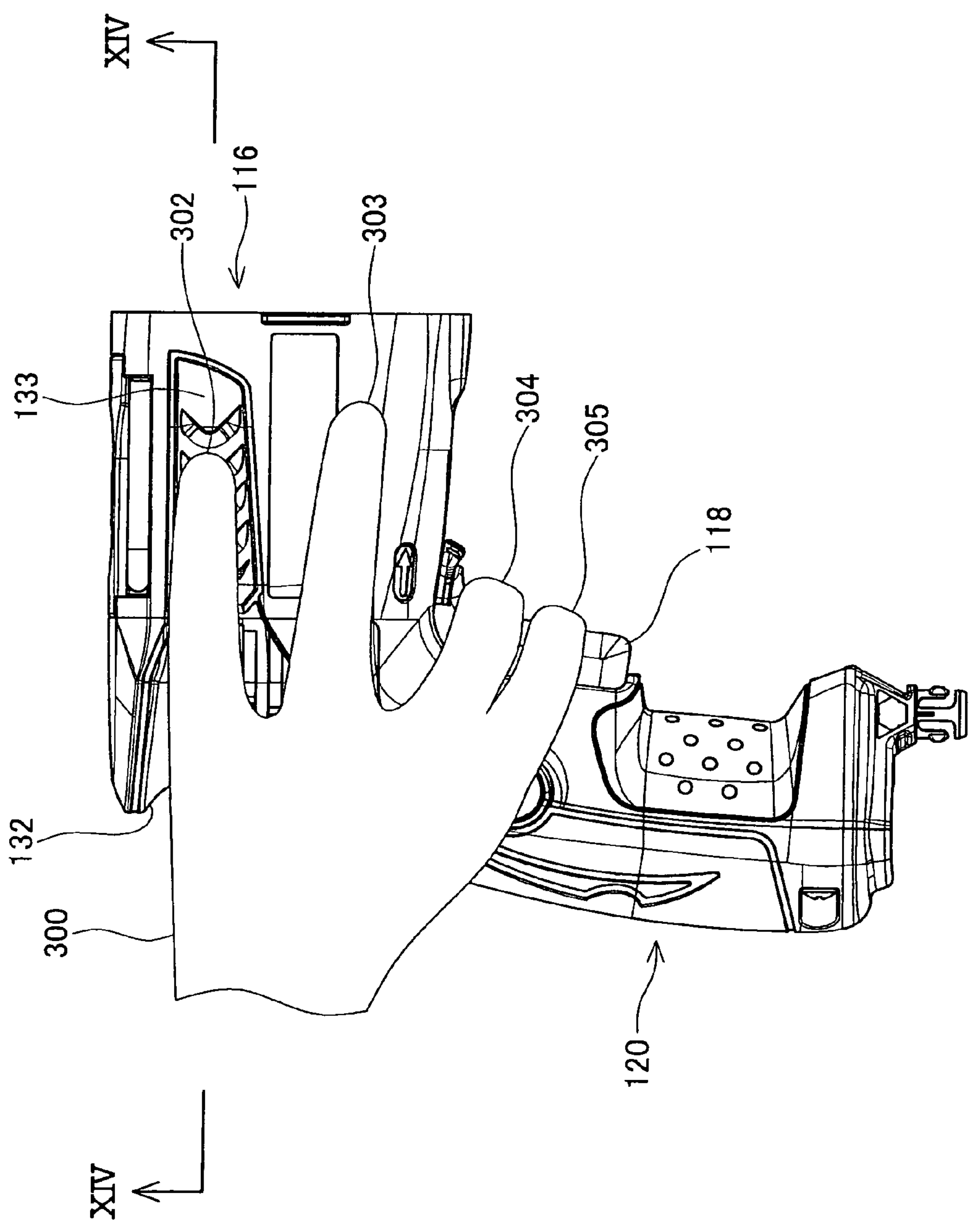
FIG. 13 shows a manner in which a user grips the power screwdriver.
Figure 14:
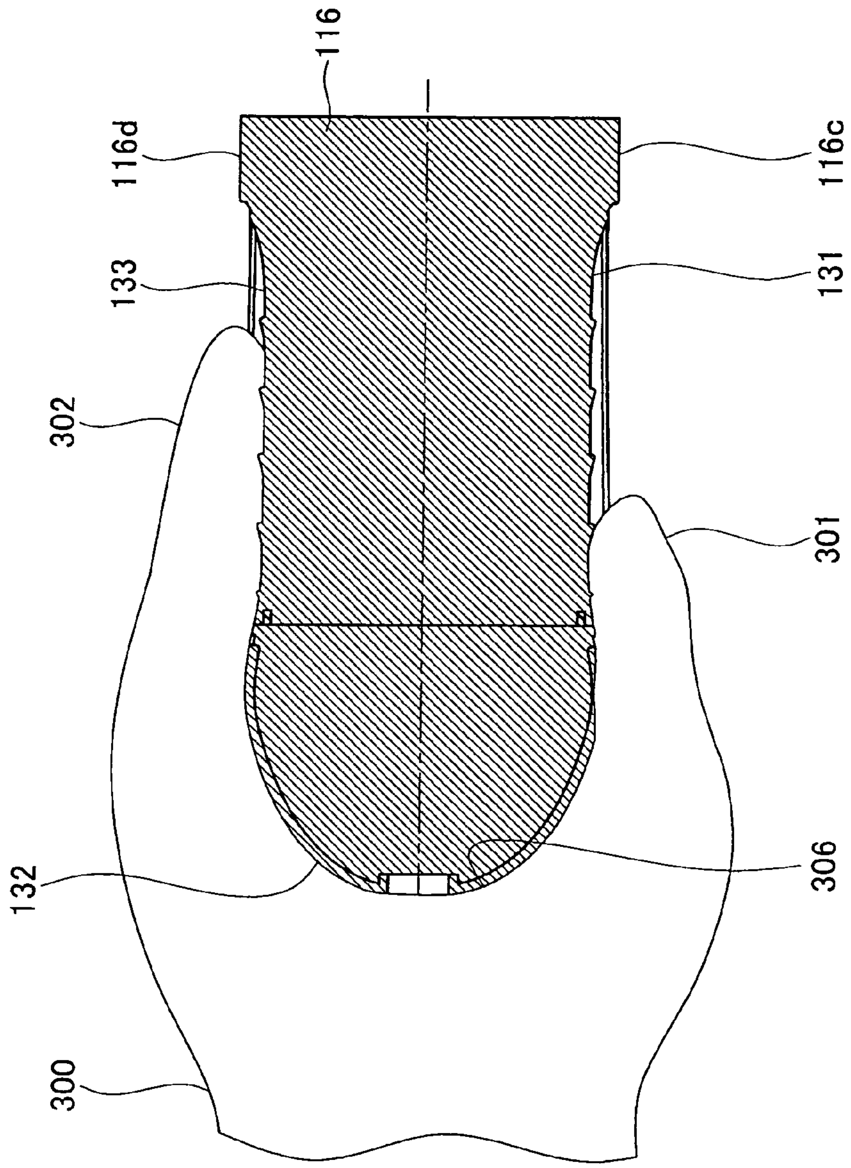
FIG. 14 shows a cross-section along line XIV-XIV in FIG. 13.

FIG. 13 and FIG. 14 show the manner in which a user grips the power screwdriver 110 with a right hand 300. As shown in FIG. 13 and FIG. 14, the user's thumb 301 is placed in one side-face groove 131, and his/her forefinger 302 is placed in the other side-face groove 133. The user's middle finger 303 is placed on the other side face 116*c* of the housing body portion 116. His/her web portion 306 between the thumb 301 and forefinger 302 is placed in the back-end groove 132. The user's ring finger 304 and little finger 305 are placed on the trigger switch 118 of the grip portion 120. In this way, when using the power screwdriver 110 of this embodiment, the user can assume a gripping attitude in which the back-end portion 116*b* of the housing body portion 116 is gripped directly.

In the gripping attitude shown in FIG. 13 and FIG. 14, the user's hand 300 is positioned above the tool rotation axis A-A. Hence the user can press the power screwdriver 110 along the tool rotation axis A-A with considerable force. The user can forcefully press the screwdriver bit against the workpiece, and can easily tighten a screw even in a comparatively hard workpiece.

In addition to the gripping attitude shown in FIG. 13 and FIG. 14, the user can also employ a gripping attitude in which all the fingers 301 to 305 are used to grip the grip portion 20.

Figure 15:
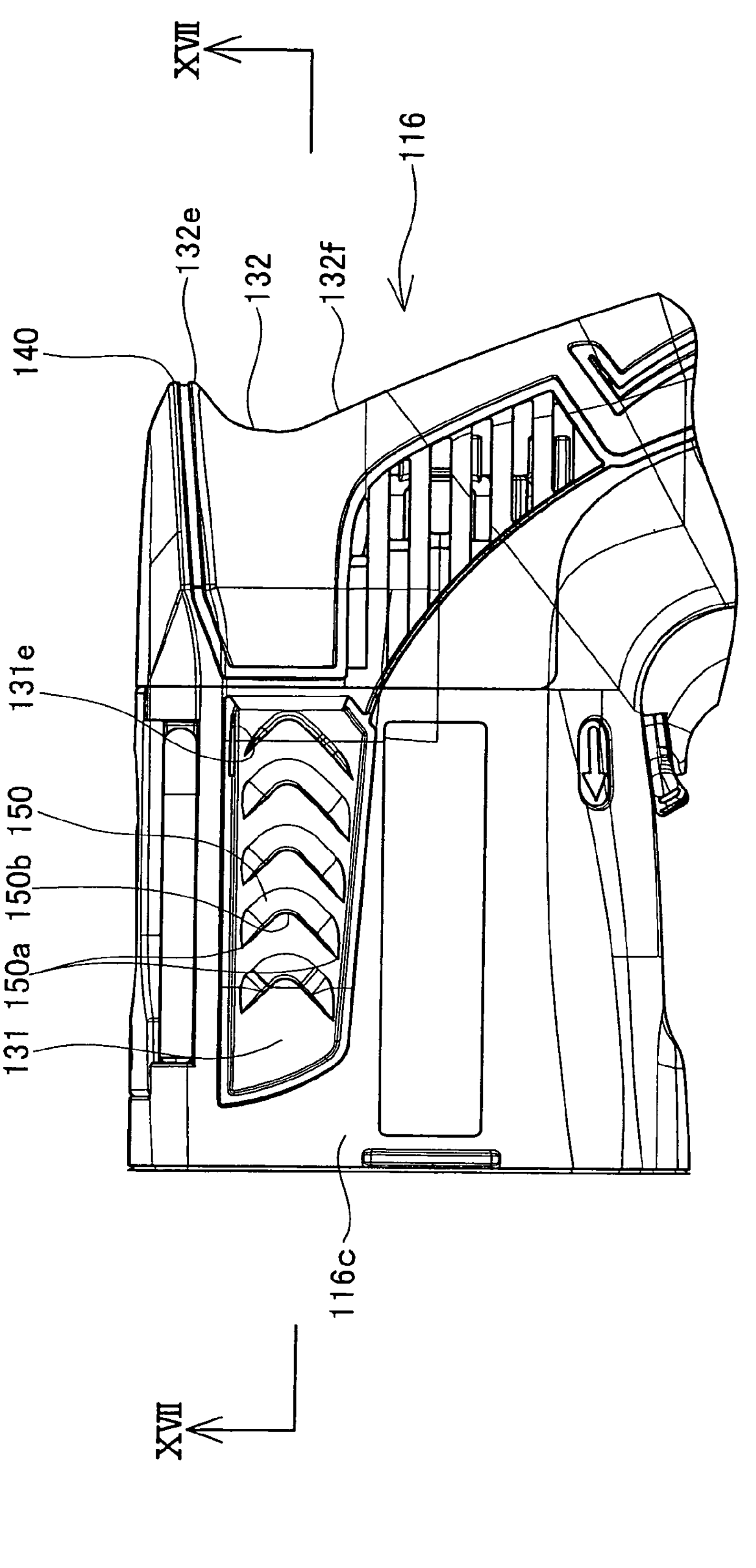
FIG. 15 shows one side view of a housing body portion.
Figure 16:
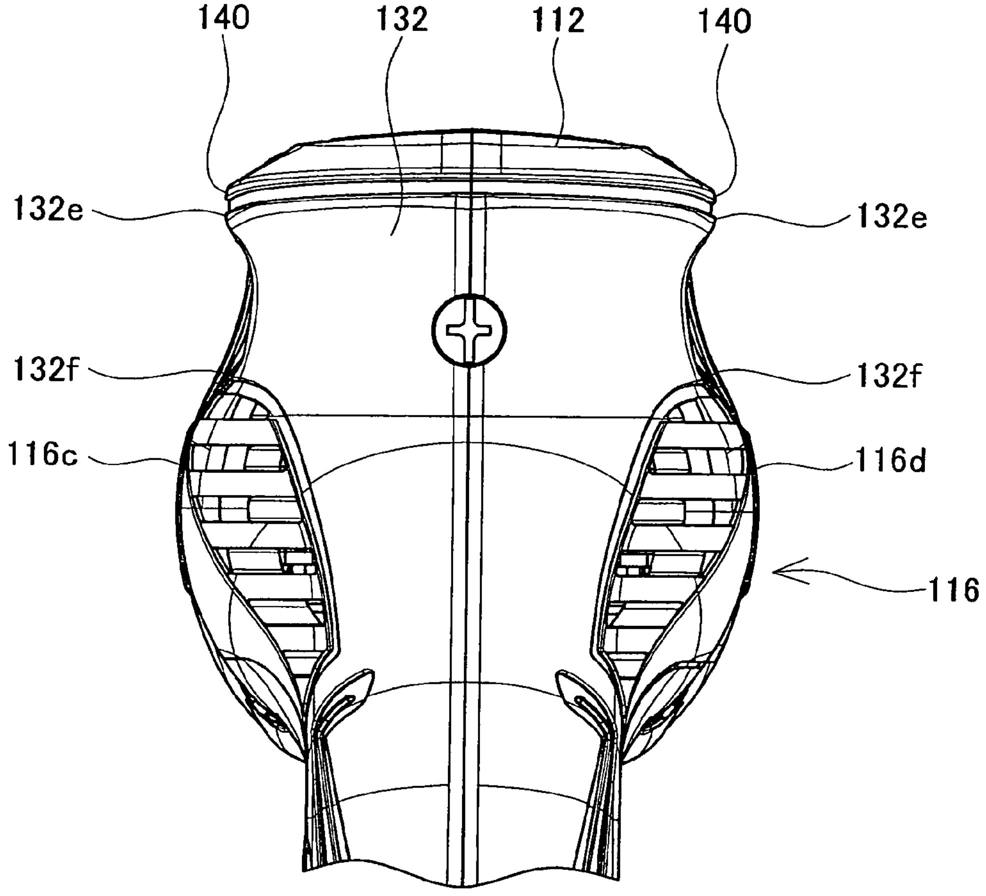
FIG. 16 shows the back-end portion of the housing body portion.
Figure 17:
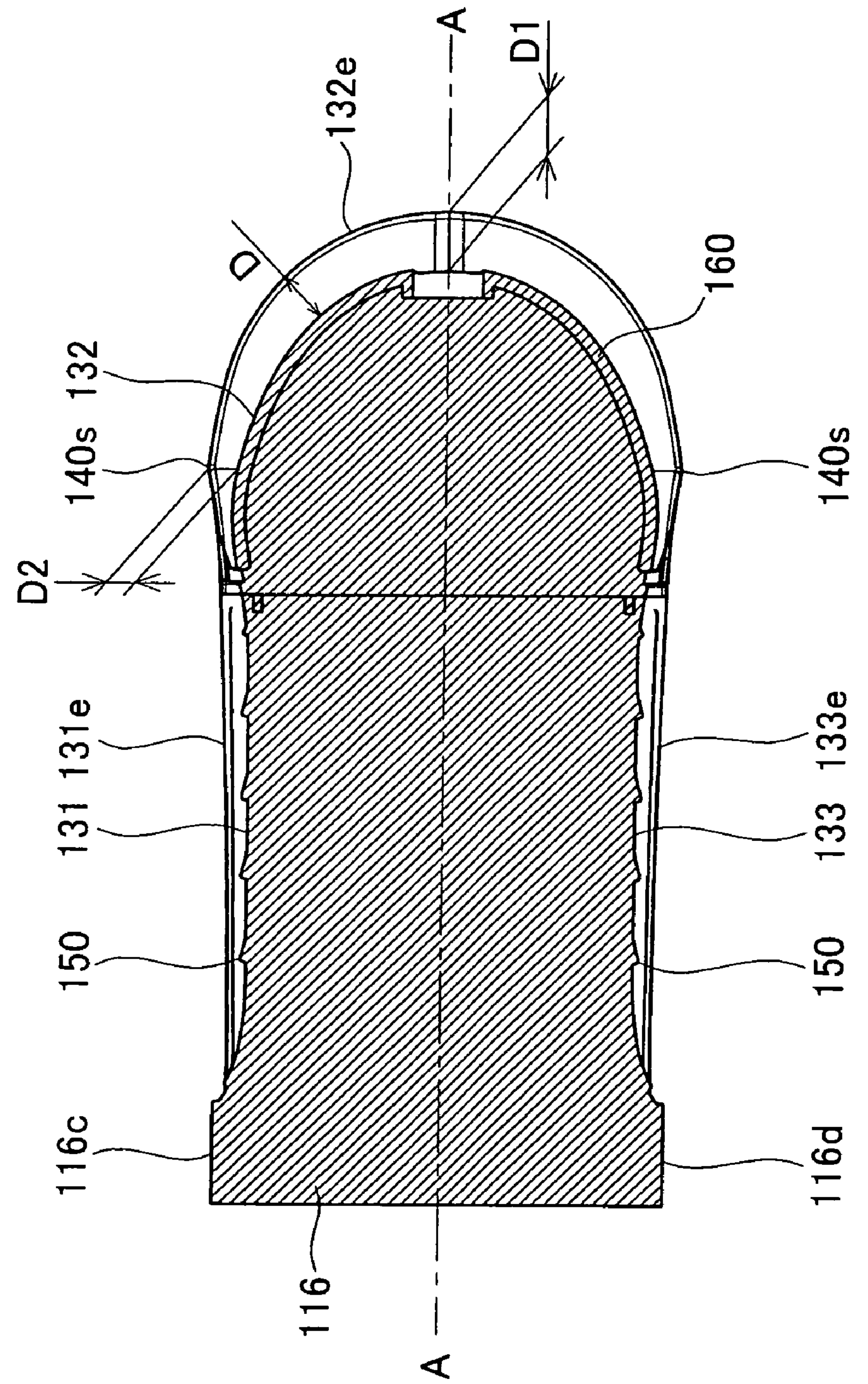
FIG. 17 shows a cross-section along line XVII-XVII in FIG. 15.

Next, the structures of the side-face grooves 131, 133 and back-end groove 132 formed in the housing body portion 116 are explained in detail, referring to FIG. 15, FIG. 16, and FIG. 17. FIG. 15 shows one side face 116*c* of the housing body portion 116. FIG. 16 shows the back-end portion 116*b* of the housing body portion 116. FIG. 17 is a cross-sectional view along line XVII-XVII in FIG. 15.

A plurality of protrusions 150 are formed in the side-face grooves 131, 133 formed in the side faces 116*c*, 116*d* of the housing body portion 116. Each protrusion 150 has a V shape, both ends 150*a* of the V-shapedly tapering protrusion 150 are positioned on the side of the front-end portion 116*a* of the housing body portion 116, and the center portion 150*b* of the protrusion 150 is shifted toward the side of the back-end portion 116*b* of the housing body portion 116. These protrusions 150 abut the user's thumb 301 and forefinger 302 when the user grips the power screwdriver 110. The user's thumb 301 and forefinger 302 are caught by these protrusions 150 and prevented from sliding.

As explained above, the flange portion 140, protruding outward, is formed in the upper portion of the back-end groove 132. By this configuration, the upper rim 132*e* of the back-end groove 132 also protrudes outward prominently. As shown in FIG. 15 and FIG. 16, in the back-end groove 132 this upper rim 132*e* protrudes more prominently from the housing body portion 116 than does the lower end 132*f* of the back-end groove 132. As shown in FIG. 15, in one portion of the back-end groove 132, the lower rim 132*f* of the back-end groove 132 is not clearly delineated. However, in the back-end groove 132 the surface is curved in a concave shape, and in the portion below the back-end groove 132 the surface is curved in a convex shape. Hence, the lower rim 132*f* of the back-end groove 132 is a point of inflection at which the direction of surface curvature changes.

As shown in FIG. 17, the upper rim 132*e* of the back-end groove 132 protrudes more prominently from the housing body portion 116 than do the upper rims 131*e*, 133*e* of the side-face grooves 131, 133. More specifically, the upper rim 132*e* of the back-end groove 132 protrudes more prominently toward the back-end side of the housing body portion 116 (that is, toward the center of the back-end groove 132). By this configuration, the depth D of the back-end groove 132 becomes deeper toward the back end of the housing body portion 116 (that is, toward the intermediate position between one end 132*a* and the other end 132*b* of the back-end groove 132). Here, the depth D of the back-end groove 132 is the depth from the upper rim 132*e* of the back-end groove 132 to the deepest portion. Specifically, it is preferable that, at the back end of the housing body portion 116, the depth D1 of the back-end groove 132 be 6 millimeters or greater, and that at the position 140*s* at which the flange portion 140 protrudes most in the side directions of the housing body portion 116, the depth D2 of the back-end groove 132 be 2 millimeters or greater. In this embodiment, the depth D1 at the back end of the housing body portion 116 is 7 millimeters, the depth D2 at the position 140S of the greatest protrusion of the flange portion 140 in the side directions of the housing body portion 116 is 3 millimeters, and the depth D of the back-end groove 132 decreases continuously from the former position to the latter position.

According to the above-described structure of the back-end groove 132, when the user grips the housing body portion 116 as shown in FIG. 13 and FIG. 14, the web portion 306 between the thumb 301 and forefinger 302 is covered from above by the flange portion 140. By this configuration, the web portion 306 between the thumb 301 and forefinger 302 is firmly maintained within the back-end groove 132. In the gripping attitude shown in FIG. 13 and FIG. 14, while it is easy to apply a force to press the power screwdriver 110, when the power screwdriver 110 is to be raised upward, the user feels the weight of the power screwdriver 110 to be heavy. In this occasion, if the web portion 306 is firmly maintained within the back-end groove 132, the user can feel the weight of the power screwdriver 110 to be comparatively dispersed, and can continue to grip the power screwdriver 110 over a long period of time.

As shown in FIG. 17, sheet material 160 formed of an elastomer is provided in the back-end groove 132. The sheet material 160 is more flexible than the material of the housing 112, and has higher friction resistance than the housing 112.

According to this structure, when the user places the web portion 306 between the thumb 301 and forefinger 302 in the back-end groove 132, the web portion 306 sinks into the sheet material 160, and the web portion 306 is securely maintained within the back-end groove 132.

As explained above, even in an attitude in which the housing body portion 116 of the power screwdriver 110 of this embodiment is gripped directly (see FIG. 13 and FIG. 14), the user can securely grip the power screwdriver 110. According to this configuration, actions of drawing the power screwdriver 110 upward, and actions of raising the power screwdriver 110, can be performed without feeling a large load. The power screwdriver 110 of this embodiment can easily be handled by the user, and the efficiency of task performance can be greatly enhanced.

In the above, the power screwdriver 110 of a second embodiment has been explained in detail; however, these are merely examples, and in no way limit the scope of claims. The technology described in the scope of claims comprises various modifications and alterations of the specific example described above.

The technology utilized in the power screwdriver of the second embodiment can be employed in various other power tools. The advantageous results of the technology of this invention are not lost depending on the type of prime mover of the power tool (electric motor, pressurized-fluid motor, internal combustion engine), or on the task application of the power tool (opening holes, tightening screws, chiseling).

In particular, the structure of the back-end groove and flange portion in the power screwdriver 110 of the second embodiment can appropriately be applied to the power drill of the first embodiment.

The technical elements disclosed in the specification or the drawings may be utilized separately or in all types of combinations, and are not limited to the combinations set forth in the claims at the time of filing of the application. Furthermore, the subject matter disclosed herein may be utilized to simultaneously achieve a plurality of objects or to only achieve one object.

The invention claimed is:

1. A portable power tool, comprising:

a prime mover that rotates a tool; and a housing that houses the prime mover, the housing comprising:

a back-end groove, into which a user can place a web between a thumb and a forefinger of the user, being formed on a back-end face of the housing that is arranged on an opposite side from the tool, and a pair of side-face grooves, into which the user can place the thumb and forefinger, being formed on both side faces of the housing, wherein a surface of the back-end groove is covered with a deformable material that is more flexible than a material of the housing, surfaces of the side-face grooves are not covered with the deformable material, and the material of the housing is exposed on the surfaces of the side-face grooves.

2. The portable power tool according to claim 1, wherein at least one side face groove includes a depth changing portion where a depth of the side-face groove is reduced toward the back-end face of the housing.

3. The portable power tool according to claim 1, wherein the at least one side-face groove further includes a constant-depth portion where the depth of the side-face groove is substantially constant, and the constant-depth portion extends from the depth changing portion toward a tool side.

4. The portable power tool according to claim 1, wherein at least one protrusion is formed in at least one of the pair of side-face grooves.

5. The portable power tool according to claim 4, wherein at least one side-face groove includes a depth changing portion where a depth of the side-face groove is reduced toward the back-end face of the housing, and the at least one protrusion is formed within the depth changing portion.

6. The portable power tool according to claim 4, wherein the at least one protrusion is made of a material softer than the material of the housing.

7. The portable power tool according to claim 4, wherein the at least one protrusion is in a V-shape tapered toward the back end side of the housing from both end portions of the V-shape to an intermediate portion of the V-shape.

8. The portable power tool according to claim 1, wherein the back-end groove becomes deeper toward the back end of the housing.

9. The portable power tool according to claim 1, wherein an upper rim portion of the back-end groove protrudes more than an lower rim portion of the back-end groove.

10. The portable power tool according to claim 1, wherein a depth of the back-end groove is equal to or greater than 6 millimeters at the back end of the housing.

11. The portable power tool according to claim 1, wherein a flange portion protruding from the housing is formed in an upper portion of the back-end groove of the housing.

12. The portable power tool according to claim 11, wherein a height of the flange portion is greatest at the back end of the housing and decreases toward the side faces of the housing.

13. The portable power tool according to claim 1, wherein the back-end groove and the pair of side-face grooves are formed in a series.

* * * * *